(12) United States Patent
Hwang et al.

(10) Patent No.: US 7,979,776 B2
(45) Date of Patent: Jul. 12, 2011

(54) ERROR CORRECTION BLOCK, METHOD AND APPARATUS FOR GENERATING ERROR CORRECTION BLOCK, AND ERROR CORRECTION METHOD

(75) Inventors: Sung-hee Hwang, Suwon-si (KR); In-sik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1261 days.

(21) Appl. No.: 11/604,858

(22) Filed: Nov. 28, 2006

(65) Prior Publication Data

US 2007/0198893 A1    Aug. 23, 2007

(30) Foreign Application Priority Data

Feb. 8, 2006 (KR) .................. 10-2006-0012052

(51) Int. Cl.
*H03M 13/00* (2006.01)
(52) U.S. Cl. .................. 714/758; 714/763; 714/769
(58) Field of Classification Search .................. 714/758, 714/763, 769
See application file for complete search history.

(56) References Cited

U.S. PATENT DOCUMENTS

| | | | | |
|---|---|---|---|---|
| 5,991,911 A | * | 11/1999 | Zook | 714/758 |
| 6,175,686 B1 | | 1/2001 | Noda | |
| 6,338,155 B1 | | 1/2002 | Noda | |
| 2005/0097428 A1 | | 5/2005 | Chang et al. | |

FOREIGN PATENT DOCUMENTS

| | | |
|---|---|---|
| CN | 1647392 | 7/2005 |
| JP | 2003-77227 | 3/2003 |
| KR | 2004-99946 | 12/2004 |

OTHER PUBLICATIONS

Chinese Office Action issued on Jul. 12, 2010, in corresponding Chinese Patent Application No. 200780004460.X (5 pages).
Search Report issued on Apr. 17, 2007 by the International Searching Authority for PCT International Patent Application No. PCT/KR2007/000150.
Taiwan Office Action issued on Mar. 5, 2010, in corresponding Taiwan Application No. 095148815 (4 pages).
Office Action issued on Jan. 31, 2007 by the Koran Intellectual Property Office for Korean Patent Application No, 2006-12052.

\* cited by examiner

*Primary Examiner* — Guy J Lamarre
(74) *Attorney, Agent, or Firm* — NSIP Law (57) ABSTRACT

An error correction block having an extended format compatible with a standardized format of a conventional error correction block, a method and apparatus for generating the error correction block, and a method of correcting an error using the error correction block. The method of generating an error correction block includes adding extra parity information for error correction to input data which is of a smaller size than main data of a standardized reference format, thereby generating an extra error correction block which is the same size as the main data, and generating an error correction block complying with the reference format using the extra error correction block as the main data.

22 Claims, 11 Drawing Sheets

513 bytes

128 rows { 96 rows: 24 Data Frames (24 x 2052 bytes) — 1402; 32 rows: 8 Data frames for Extra parities (8 x 2052 bytes) — 1404 } RS (128, 96, 33) code

FIG. 15

RS (128, 96, 33) code

| Main data (96 bytes) | Extra parity (32 bytes) |

FIG. 16

ERROR CORRECTION BLOCK, METHOD AND APPARATUS FOR GENERATING ERROR CORRECTION BLOCK, AND ERROR CORRECTION METHOD

CROSS-REFERENCE TO RELATED APPLICATION

This application claims the benefit of Korean Application No. 2006-12052, filed Feb. 8, 2006, in the Korean Intellectual Property Office, the disclosure of which is incorporated herein by reference.

BACKGROUND OF THE INVENTION

1. Field of the Invention

An aspect of the present invention relates to an error correction code (ECC) format, and more particularly, to an error correction block having an extended format compatible with a standardized format of a conventional error correction block, a method and apparatus for generating the error correction block, and a method of correcting an error using the error correction block.

2. Description of the Related Art

In existing optical disc systems such as digital versatile discs (DVDs), high definition DVDs (HD DVDs), and Blu-ray discs, performance of correction of a burst error due to a scratch or a fingerprint and correction of a random error due to dust is determined according to a standard error correction block format. When a disc is used, reliability of data recorded onto the disc is gradually decreased due to dust, scratches, or fingerprints when recording or reproducing the disc. In particular, a burst error (such as a scratch due to a physical cut on a surface of a disc) is fatal to the reliability of data. Therefore, it is difficult to recover data whose reliability is deteriorated due to a burst error.

According to conventional standards, continuous errors having a length corresponding to about 16 rows (16*182+10 bytes), 32 rows (32*182+10 bytes), and 64 rows (64*182+10 bytes) in an ECC format can be corrected with respect to a DVD, an HD DVD, and a Blu-ray disc, respectively. Although a physical length corresponding to such correctable continuous error length may be different according to recording density, continuous errors corresponding to physical lengths of about 6 mm, 6.4 mm, and 9 mm can be corrected with respect to a DVD, an HD DVD, and a Blu-ray disc, respectively.

As described above, a disc becomes corrupted due to deterioration caused by the repetitive use of the disc and data reliability is decreased due to continuous errors such as scratches or fingerprints. A physical cut such as a scratch on a surface of a disc may occur when an objective lens of a pickup used for recording/reproducing data collides with the surface of the disc or due to user's carelessness. As a result, the life of the disc is shortened. In particular, even though data is reliable when recorded, if a physical cut such as a scratch occurs on a surface of the disc onto which the data has been recorded, it is highly likely that the data will fail in terms of error correction when the data is reproduced.

When an error cannot be corrected during reproduction because of the deterioration of data reliability, information recorded by a user will be lost. Accordingly, an ECC format with improved error correction performance is desired. Furthermore, when a new ECC format is used to increase the data reliability without considering compatibility with an existing ECC format, reproduction compatibility with existing products is not guaranteed, which may greatly restrict the use of discs.

SUMMARY OF THE INVENTION

Accordingly an aspect of the present invention provides an error correction block which is compatible with an existing standard error correction code (ECC) format and which prevents data reliability from decreasing, a method and apparatus for generating the error correction block, and a method of correcting an error using the error correction block.

According to an aspect of the present invention, there is provided an error correction block having an extended format including an error correction block structure including main data, additional information, and parity information in a standardized reference format, wherein the main data is an extra error correction block including input data and extra parity information for error correction of the main data.

According to another aspect of the present invention, there is provided a method of generating an error correction block having an extended format compatible with an error correction block having a standardized reference format. The method includes adding extra parity information for error correction to input data which is of a smaller size than main data of the reference format, thereby generating an extra error correction block which is the same size as the main data; and generating an error correction block complying with the reference format using the extra error correction block as the main data.

According to another aspect of the present invention, the generating of the error correction block complying with the reference format may include adding additional information including an error detection code to the extra error correction block, scrambling data in the extra error correction block excluding the additional information, and adding parity information for error correction to the extra error correction block with the additional information to generate the error correction block.

According to another aspect of the present invention, the adding of the parity information for error correction to the extra error correction block may include adding outer-code parity information for error correction of the error correction block to the extra error correction block, and adding inner-code parity information for error correction of the error correction block to the extra error correction block.

According to another aspect of the present invention, the adding of the additional information may include adding address information of the extra error correction block.

According to another aspect of the present invention, the error correction block having the reference format may comply with a compact disc standard, a digital versatile disc standard, a high-definition digital versatile disc standard, or a Blu-ray disc standard.

According to still another aspect of the present invention, there is provided a method of generating an error correction block having an extended format compatible with an error correction block having a standardized reference format. The method includes adding additional information including at least an error detection code to input data which is a smaller size than main data of the reference format; generating an extra error correction block by adding extra parity information for error correction to the additional information added input data; replacing data in a portion corresponding to additional information in the extra parity information within the extra error correction block with corresponding additional information of the reference format; and generating an error correction block complying with the reference format by adding parity information for error correction to the extra error correction block with the replaced additional information.

According to another aspect of the present invention, the size of the input data may be integer multiples of a size of a data frame included in the error correction block having the reference format.

According to yet another aspect of the present invention, there is provided an error correction method using an error correction block having an extended format including an error correction block structure including main data, additional information, and parity information in a standardized reference format, wherein the main data is an extra error correction block including input data and extra parity information. The error correction method includes receiving data having an error correction block structure in the extended format; sensing errors in the received data; when any error is sensed, correcting the error using the parity information; and when all sensed errors are not successfully corrected, correcting remaining errors using the extra parity information.

According to a further aspect of the present invention, there is provided an apparatus for generating an error correction block having an extended format compatible with an error correction block having a standardized reference format. The apparatus includes an extra error correction block generator receiving input data which is of a smaller size than main data of the reference format and adding extra parity information for error correction to the input data to generate an extra error correction block having the same size as the main data; and an error correction block generator generating and outputting an error correction block complying with the reference format using the extra error correction block as the main data.

According to another aspect of the present invention, there is provided an apparatus for generating an error correction block having an extended format compatible with an error correction block having a standardized reference format. The apparatus includes an extra error correction block generator receiving input data which is a smaller size than main data of the reference format, adding additional information including at least an error detection code to the input data, and adding extra parity information for error correction to the input data with the additional information to generate an extra error correction block; and an error correction block replacing data in a portion corresponding to additional information in the extra parity information within the extra error correction block with corresponding additional information of the reference format and adding parity information for error correction to the extra error correction block with the replaced additional information to generate and output an error correction block complying with the reference format.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become more apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
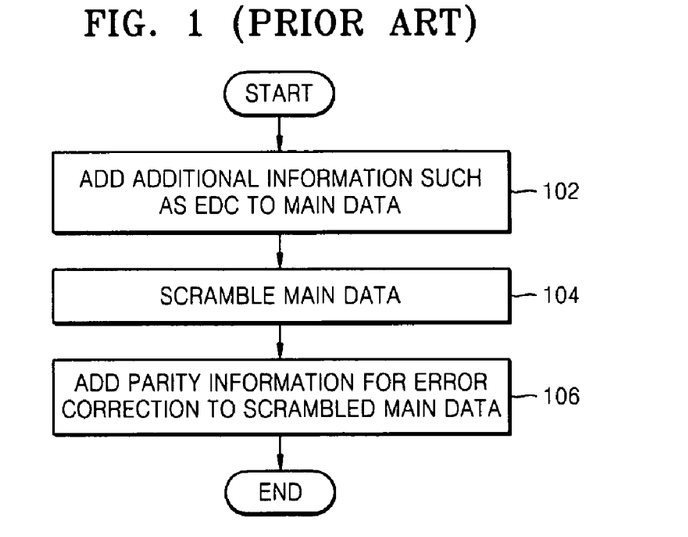
FIG. 1 is a flowchart of a method of generating an error correction block having a conventional standard format.

FIG. 1 is a flowchart of a method of generating an error correction block having a conventional standard format. The error correction block having the conventional standard format is structured by adding additional information (such as an error detection code (EDC) and parity information for error correction) to input data (i.e., main data). To generate such a conventional error correction block, the additional information is added to the main data in operation 102. Next, the main data is scrambled in operation 104. The parity information is added to the scrambled main data block in operation 106, whereby the error correction block is generated.

Figure 2:
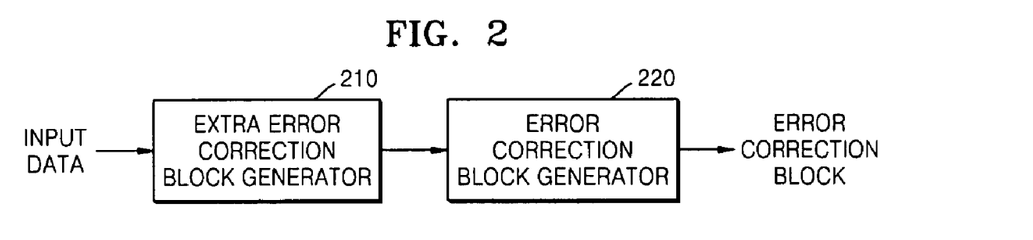
FIG. 2 illustrates an apparatus for generating an error correction block having an extended format according to an embodiment of the present invention.

FIG. 2 illustrates an apparatus for generating an error correction block having an extended format according to an embodiment of the present invention. Referring to FIG. 2, the apparatus for generating an error correction block includes an error correction block generator 220 generating an error correction block according to a conventional standard as illustrated in FIG. 1 and an extra error correction block generator 210 pre-processing input data. The extra error correction block generator 210 generates main data input to the error correction block generator 220 by adding extra parity information to the input data. The detailed structure of an extra error correction block generated by the extra error correction block generator 210 will be described later.

Figure 3:
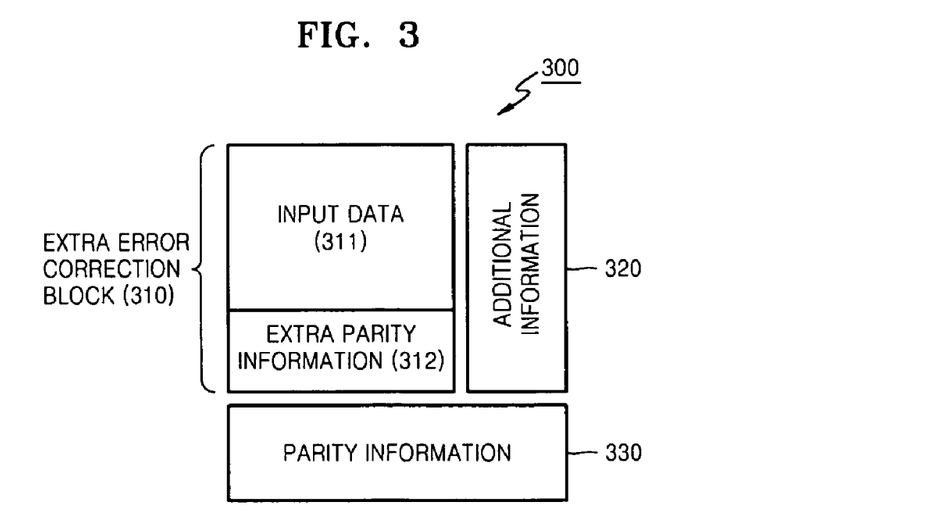
FIG. 3 is a conceptual diagram of an error correction block having an extended format according to an embodiment of the present invention.

FIG. 3 is a conceptual diagram of an error correction block 300 having an extended format according to an embodiment of the present invention. The shown error correction block 300 has the same structure as an error correction block having a standard format and includes main data 310, additional information 320, and parity information 330. To distinguish the standard format from an extended format according to an aspect of the present invention, the standard format for an error correction block in compact discs (CDs), digital versatile discs (DVDs), high definition DVDs (HD DVDs), and Blu-ray discs is referred to as a reference format. The error correction block 300 according to the current embodiment of the present invention has the extended format including an extra error correction block 310, which is of the same size as the main data, and is made by adding extra parity information 312 for extra error correction to input data 311 which is of a smaller size than the main data included in the reference format. The additional information 320 may be included in the extra error correction block 310 in the various embodiments of the present invention herein below, but need not be in all aspects.

Figure 4:
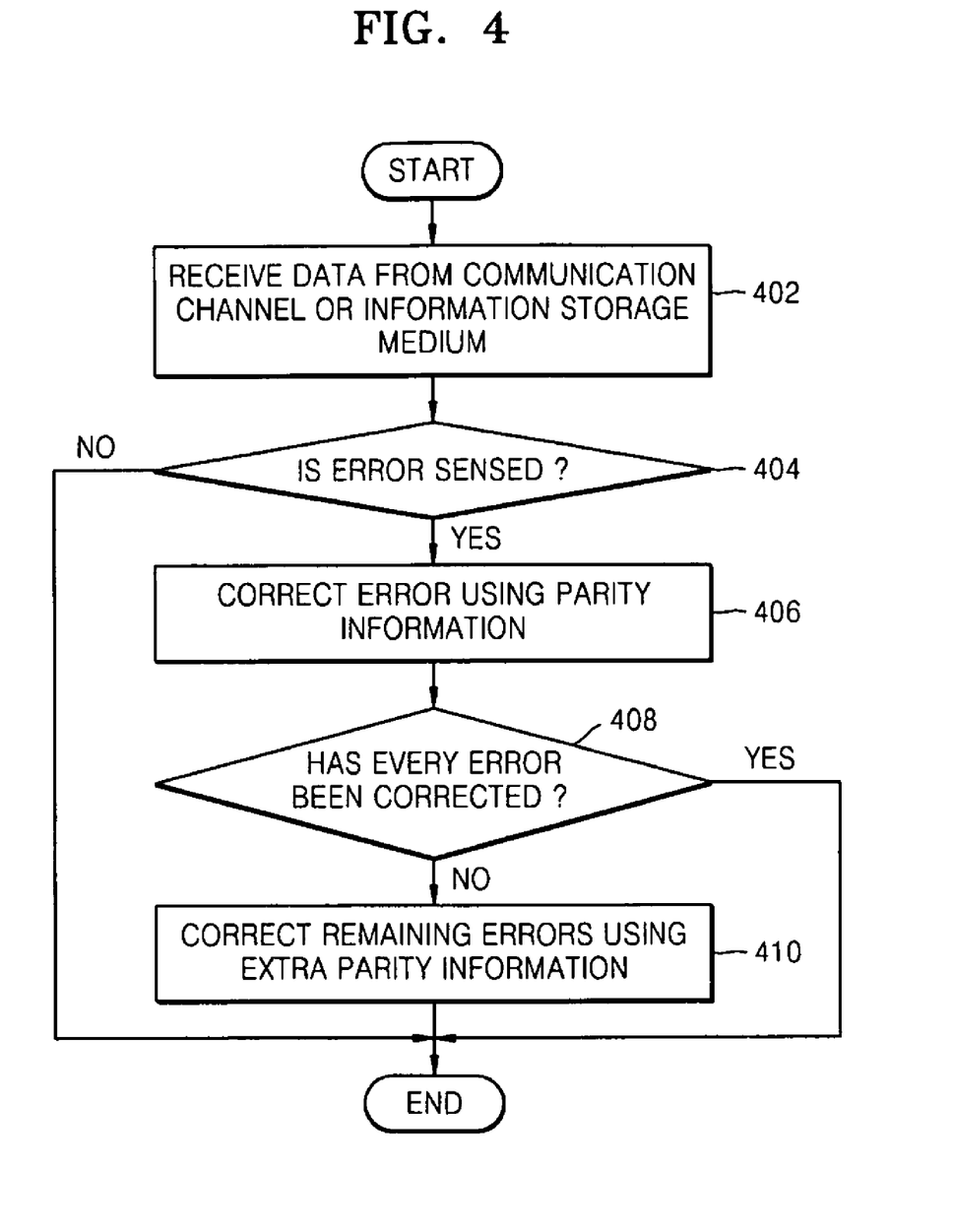
FIG. 4 is a flowchart of a method of correcting an error using an error correction block according to an embodiment of the present invention.

FIG. 4 is a flowchart of a method of correcting an error using an error correction block according to an embodiment of the present invention. In operation 402, data with an error correction block structure having an extended format according to an embodiment of the present invention is received from a communication channel or from an information storage medium. For instance, the data can be read by an optical pickup of a recording and/or reproducing apparatus, or received through a network. In operation 404, it is determined whether an error exists in the received data. When it is determined that an error exists in the received data, error correction is performed using parity information of the reference format of an error correction block in operation 406. The procedure up to operation 406 is the same as for a conventional error correction procedure. Extra parity information according to an embodiment of the present invention is used when error correction according to the conventional standard is performed but fails to correct all errors. In other words, when every error cannot be corrected using parity information of the reference format since there are so many bits having errors as realized in operation 408, remaining errors are corrected using extra parity information included in the error correction block according to an embodiment of the present invention in operation 410.

Two different methods of generating an error correction block according to embodiments of the present invention will be described with reference to FIGS. 5 and 6.

Figure 5:
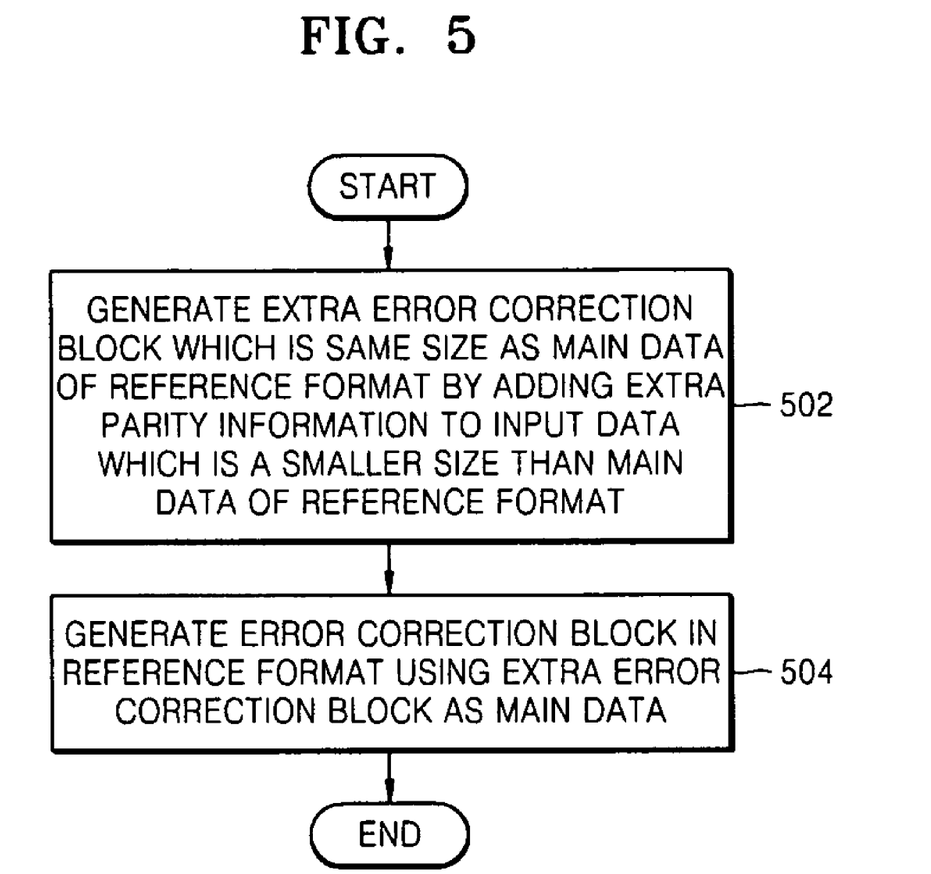
FIG. 5 is a flowchart of a method of generating an error correction block having an extended format according to an embodiment of the present invention.

FIG. 5 is a flowchart of a method of generating an error correction block having an extended format according to an embodiment of the present invention. Referring to FIG. 5, in operation 502, an extra error correction block which is of the same size as the main data of the reference format is generated by adding extra parity information for error correction to input data which is of a smaller size than the main data. In operation 504, an error correction block having the reference format according to the conventional standard is generated using the extra error correction block as the main data. In other words, after the extra error correction block is generated according to an embodiment of the present invention, additional information (such as an EDC is added) and data excluding the additional information is scrambled, and parity information is added, according to the conventional method of generating an error correction block, whereby an error correction block having an extended format is generated.

Figure 6:
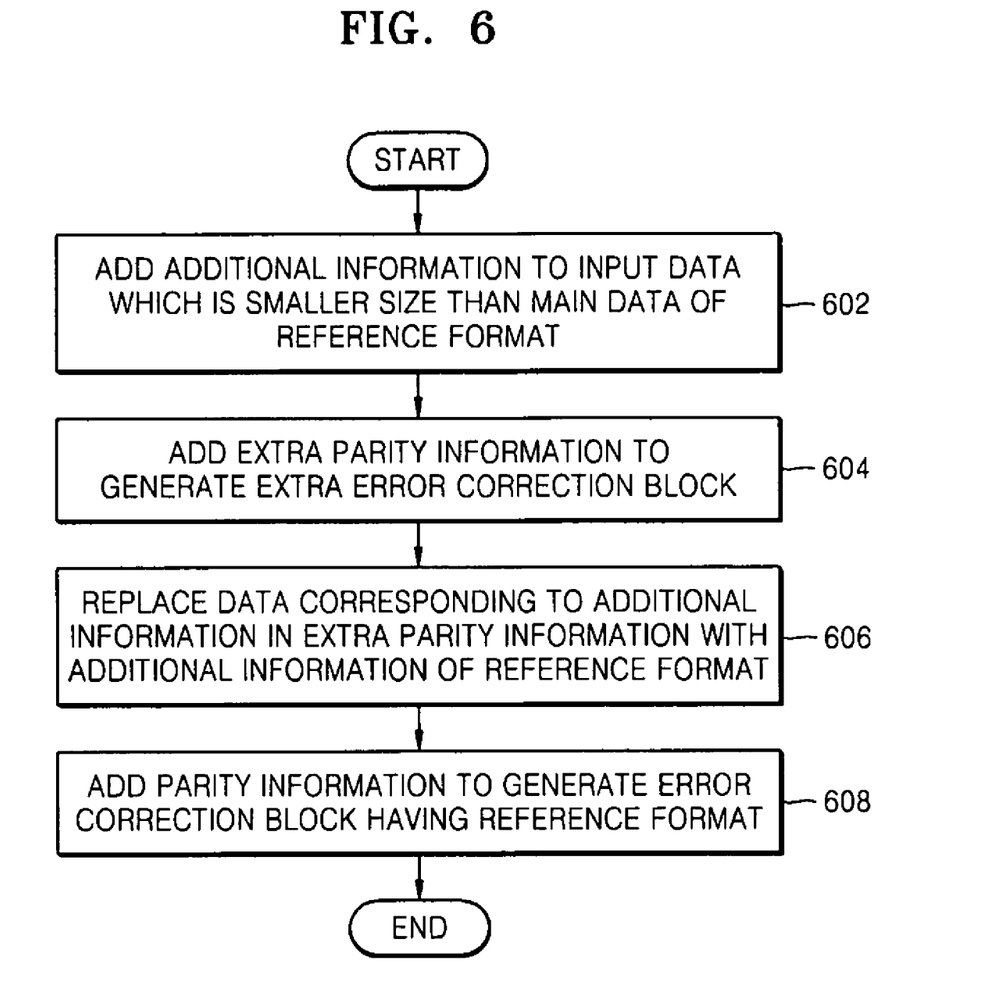
FIG. 6 is a flowchart of a method of generating an error correction block having an extended format according to another embodiment of the present invention.

FIG. 6 is a flowchart of a method of generating an error correction block having an extended format according to another embodiment of the present invention. In operation 602, additional information such as an EDC is added to input data which is of a smaller size than the main data of the reference format. In operation 604, extra parity information for extra error correction is added to the input data with the additional information, thereby generating an extra error correction block. In operation 606, data in a portion corresponding to additional information in the extra parity information included in the extra error correction block is replaced with additional information according to the reference format. Since a portion in which extra parity information is recorded is considered to be included in the main data according to the reference format, the additional information of the reference format needs to be included in the extra parity information in order to be compatible with the reference format in terms of reproduction. Here, it is preferable, but not necessary, to replace data in a portion corresponding to at least an EDC. In some applications, since address information is added to main data, data in a portion in which the address information is to be recorded may be replaced with information according to the reference format. In operation 608, data excluding the additional information in the extra error correction block is scrambled and parity information for error correction is added, thereby generating an error correction block having the reference format. As a result, the generated error correction block has an extended format including extra parity information.

Figure 7A:
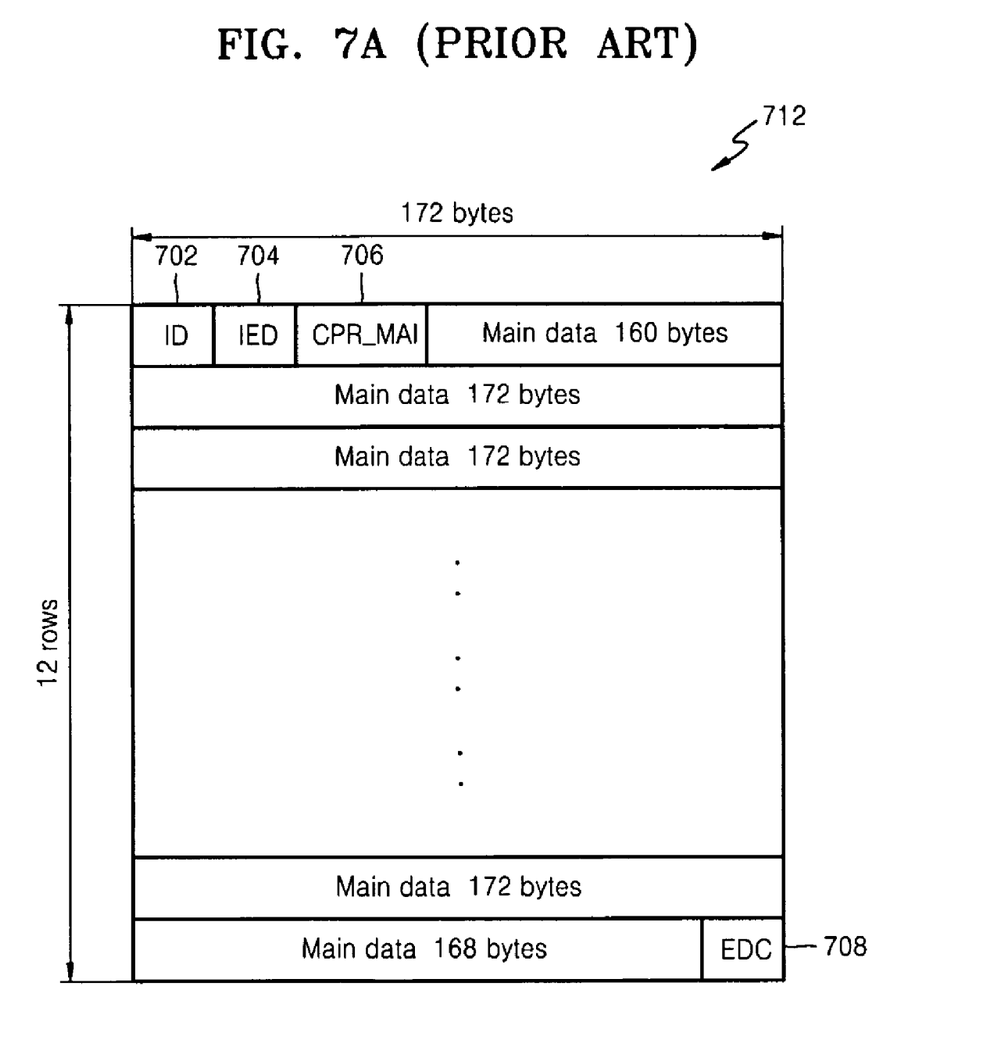
FIG. 7A illustrates the structure of a-data frame according to a conventional digital versatile disc (DVD) standard.

Hereinafter, embodiments for generating an error correction block that is compatible in terms of reproduction with a DVD standard according to an aspect of the present invention will be described. FIG. 7A illustrates the structure of a data frame 712 according to the conventional DVD standard. Referring to FIG. 7A, the data frame 712 includes 2064-byte data formed by adding a 4-byte EDC 708 for verifying error correction to 2060-byte data. This 2060-byte data is formed by adding a 4-byte ID 702, a 2-byte IED 704 for ID error detection, and a 6-byte CPR_MAI 706 to 2048-byte main data.

Figure 7B:
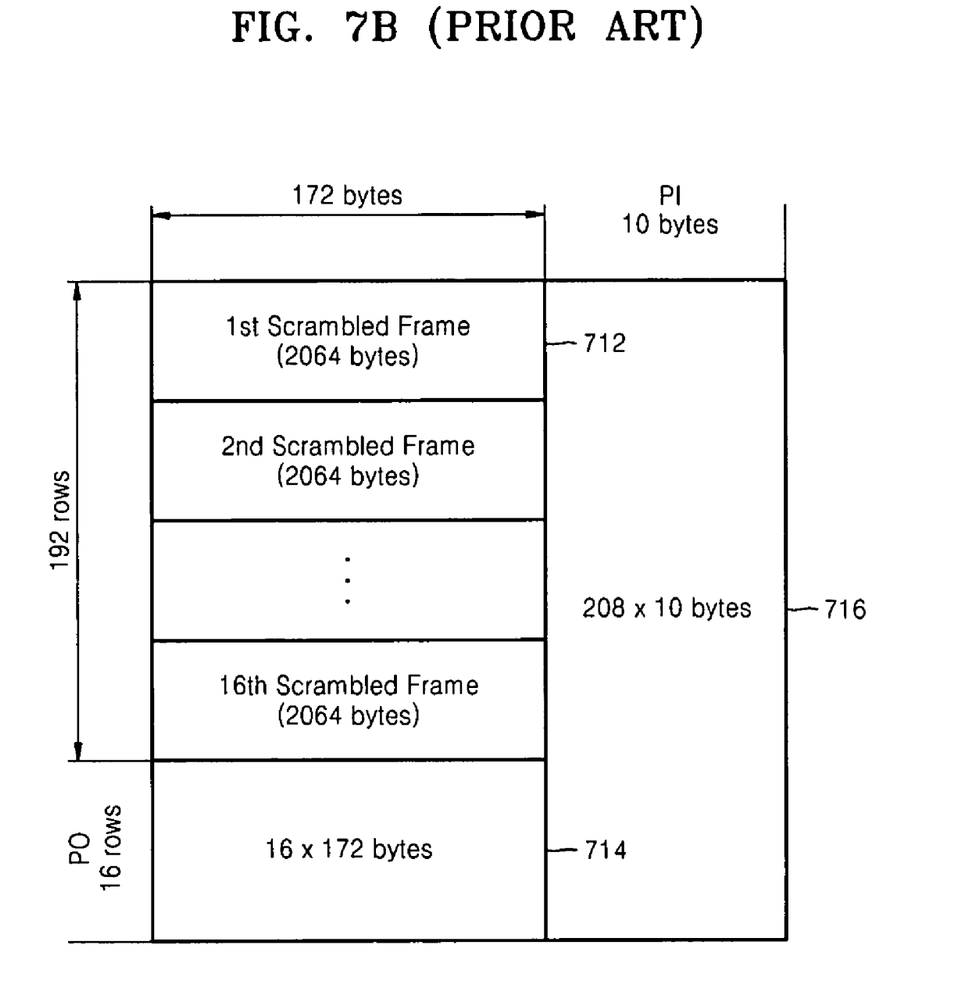
FIG. 7B illustrates the structure of an error correction block according to the conventional DVD standard.

FIG. 7B illustrates the structure of an error correction block according to the conventional DVD standard. Referring to FIG. 7B, the 2048-byte main data in the data frame 712 illustrated in FIG. 7A is scrambled to generate a first 2064-byte scrambled frame 712. In this way, 16 scrambled frames 712 are generated and form a 32-Kbyte main data block. Thereafter, to form an outer-code of RS(208, 192, 17), 16-bytes outer-code parity (PO) information 714 is added to each of 172 columns. Next, to form an inner-code of RS(182, 172, 11), 10-byte inner-code parity (PI) information 716 is added to each of 208 rows. As a result, the error correction block is generated. In such a structure, errors in the error correction block may be corrected by alternately and repetitively correcting inner codes and outer codes. Here, a maximum of 16*182+10=2922 bytes of error can be corrected using erasure correction.

Figure 8A:
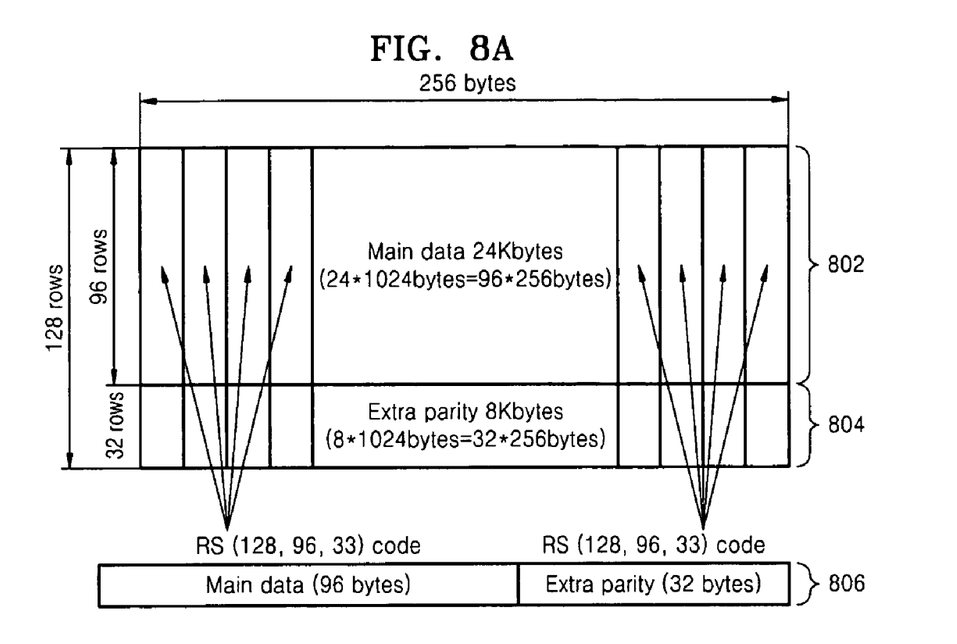
FIG. 8A illustrates an example of an extra error correction block generated to be compatible with the DVD standard using the method illustrated in FIG. 5.
Figure 8B:
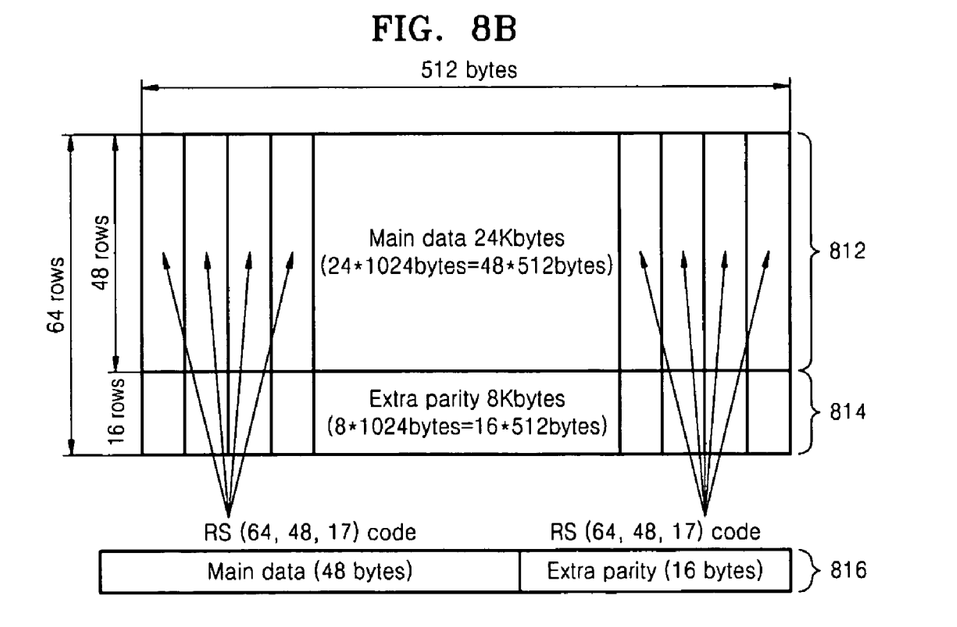
FIG. 8B illustrates another example of an extra error correction block generated to be compatible with the DVD standard using the method illustrated in FIG. 5.

FIGS. 8A and 8B respectively illustrate two examples of an extra error correction block generated so as to be compatible with the DVD standard using the method illustrated in FIG. 5. As described above, when an error correction block having the conventional reference format is generated for DVDs, 16 scrambled frames are made using 32-Kbyte main data (i.e., 16*2048 bytes=32 Kbytes) and then PO and PI information is added. However, in an embodiment of the present invention, an error correction block is generated using input data which is of a smaller size than the main data of the reference format. For example, 24-Kbyte main data is received and 8-Kbyte extra parity information is added to the 24-Kbyte main data, thereby generating a 32-Kbyte extra error correction block which is of the same size as the main data of the reference format. Next, an error correction block is generated using the extra error correction block as the main data according to a conventional method of generating an error correction block for DVDs.

Referring to FIG. 8A, 24-Kbyte main data has a structure 802 of 96*256 bytes and 32-byte extra parity information 804 is added to each column of the main data. As a result, a 32-Kbyte extra error correction block including 256 RS(128, 96,33) codes 806 is formed.

Referring to FIG. 8B, 24-Kbyte main data has a structure 812 of 48*512 bytes and 16-byte extra parity information 814 is added to each column of the main data. As a result, a 32-Kbyte extra error correction block including 512 RS(64, 48, 17) codes 816 is formed. Here, the extra parity information 814 and an outer-code in a final error correction block are of the same size of 16 bytes. Accordingly, when errors in an extra error correction block are corrected using the extra parity information 814, an existing RS(208, 192, 17) outer-code can be used as it is, by adding 144 bytes having a value of 00 h to the front of the RS(64, 48, 17) codes 816.

As illustrated in FIGS. 8A and 8B, when data of a 32-Kbyte extra error correction block with extra parity information is input and an error correction block is generated using the conventional method based on the input data, an extended error correction block is obtained that is compatible in terms of reproduction with conventional DVD error correction systems. While there is an error that cannot be corrected by a conventional error correction system, an error correction system, having a reproduction function based on extra parity information according to an embodiment of the present invention, corrects the 32-Kbyte extra error correction block using extra parities, thereby increasing the reliability of main data included in an entire error correction block when the main data is reproduced. When an error is corrected using an extra parity according to the present embodiment, if main data has a size of 28 Kbytes and an extra parity has a size of 4 Kbytes, a maximum of 16*256=4096 bytes, which is about 1.4 times the maximum number of error bytes that can be corrected by the conventional method, can be corrected. If main data has a size of 24 Kbytes and an extra parity has a size of 8 Kbytes, a maximum of 32*256=8192 bytes, which is about 2.8 times the maximum number of errors that can be corrected by the conventional method, can be corrected.

Figure 9:
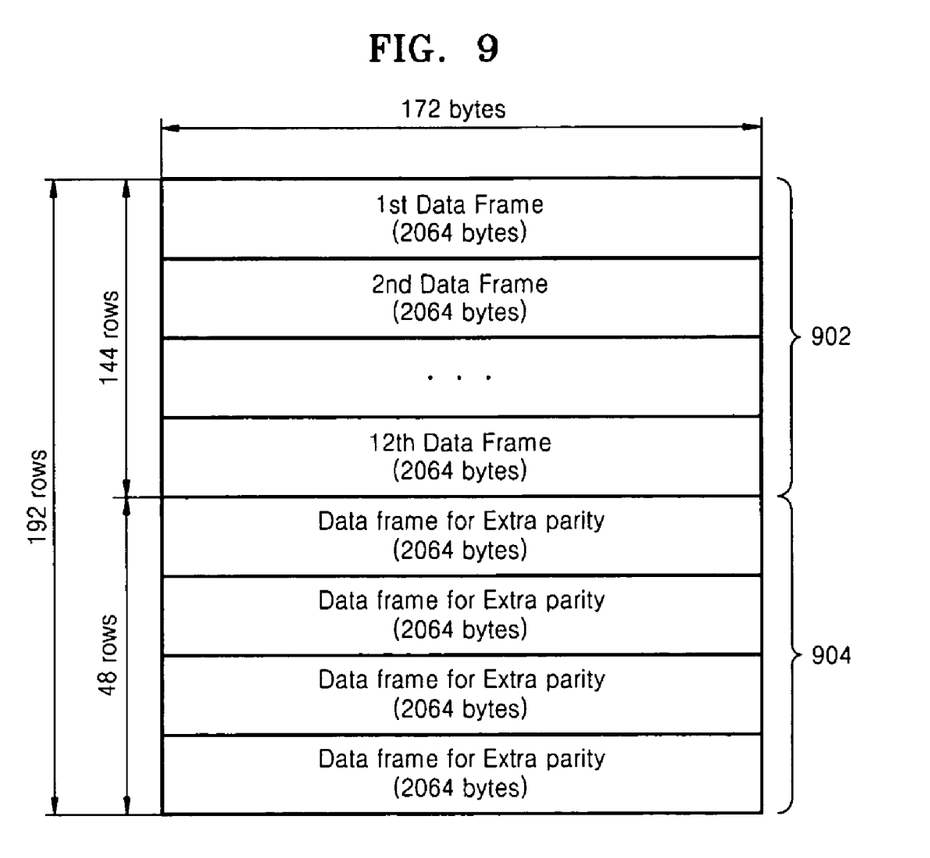
FIG. 9 illustrates an example of an extra error correction block generated to be compatible with the DVD standard using the method illustrated in FIG. 6.

FIG. 9 illustrates an example of an extra error correction block generated to be compatible with the DVD standard using the method illustrated in FIG. 6. Referring to FIG. 9, 24-Kbyte input data instead of 32-Kbyte main data of the standardized reference format is divided by 2 Kbytes; and 4-byte ID, 2-byte IED, and 6-byte CPR_MAI are added to each frame, thereby forming 2060-byte data. Thereafter, a 4-byte EDC is added to the 2060-byte data. As a result, 12 2064-byte data frames 902 are formed. Thereafter, a 4*2064 byte extra parity 904 is added to the 12 data frames 902, thereby forming a 16*2064 byte extra error correction block.

Data corresponding to ID, IED, and CPR_MAI in the 4 data frames 904 for extra parities are replaced by using a conventional method of forming an error correction block. Data corresponding to an EDC in the four data frames 904 is also replaced with an EDC corresponding to the leading 2060 Kbytes. Finally, 16*2048-byte data other than the ID, the IED, the CPR_MAI, and the EDC in the 16 2064-byte data frames 902 and 904 is scrambled, thereby forming 16 scrambled frames. Thereafter, PO and PI information is added to the 16 scrambled frames, thereby generating an error correction block having an extended format. When the extra error correction block illustrated in FIG. 9 is used, the maximum number of error bytes that can be corrected is about (48−1)*172=8084 bytes.

Figure 10A:
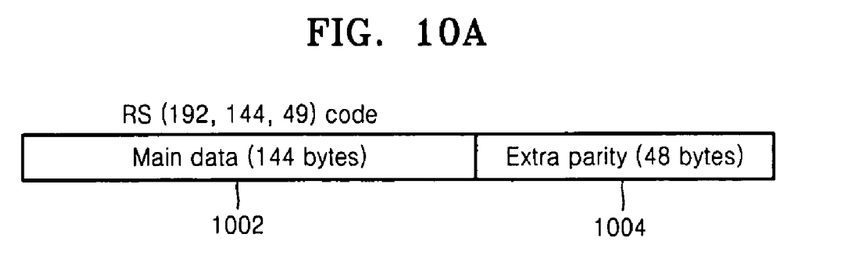
FIG. 10A illustrates an example of a Reed-Solomon (RS) code for each column in the extra error correction block illustrated in FIG. 9.

FIG. 10A illustrates an example of a Reed-Solomon (RS) code for each column in the extra error correction block illustrated in FIG. 9. Referring to FIG. 10A, a single RS(192, 144,49) code including 144-byte main data 1002 and 48-byte extra parity information 1004 is formed for each column (i.e., 192 bytes) in the extra error correction block illustrated in FIG. 9.

Figure 10B:
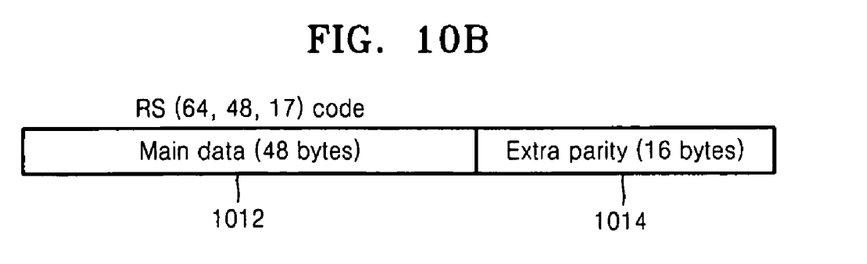
FIG. 10B illustrates another example of an RS code for each column in the extra error correction block illustrated in FIG. 9.

FIG. 10B illustrates another example of an RS code for each column in the extra error correction block illustrated in FIG. 9. Referring to FIG. 10B, 144-byte data in each column of the extra error correction block illustrated in FIG. 9 is divided into three 48-byte data parts and 16-byte extra parity information 1014 is added to each 48-byte main data 1012, thereby forming an RS(64,48, 17) code. When the RS(64,48, 17) code is formed, a single column having a size of 192 bytes includes 3 codewords. Accordingly, when continuous errors in a column are separated using three codewords by interleaving in which three RS(64,48, 17) codes are alternately arranged, error correction performance is increased.

Due to the replacement of ID, IED, CPR_MAI and EDC in the data frames 904 for extra parities, a replaced portion in the RS codes illustrated in FIGS. 10A and 10B may be recognized as an error. Accordingly, it is preferable to disperse errors, which occur in RS codes due to the replacement, to codewords during the interleaving of the RS codes. When an RS code is formed without considering the replacement of ID, IED, CPR_MAI, and EDC in an extra parity frame, i.e., without performing interleaving on an extra parity portion, a 4-byte error, which occurs due to the replacement of ID, IED, CPR_MAI, and EDC in the first 12 columns and last 4 columns, exists in particular codewords. In this case, error correction performance with respect to an entire extra error correction block is decreased. For example, when a column having a size of 192 bytes is made into one or more codewords, it is preferable to arrange a portion corresponding to extra parities in 48 rows after the codewords are formed so that data corresponding to the ID, IED, CPR_MAI, and EDC (having a size of 16 bytes per data frame and thereby having a total of 64 bytes) is uniformly dispersed to the codewords forming the extra error correction block. If the extra error correction block includes more than 64 codewords, at most a 1-byte error exists in a single codeword. Since the position of this error is already known, the decrease of reliability can be reduced through erasure correction.

Figure 11:
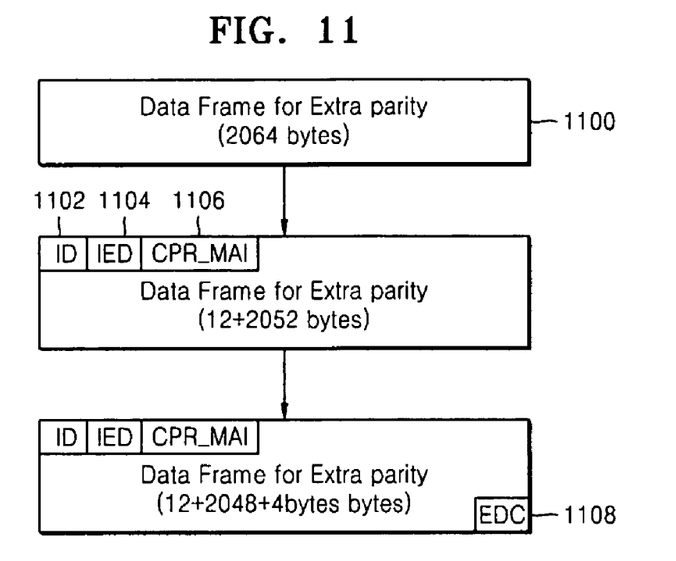
FIG. 11 illustrates a procedure for replacing additional information in a data frame for an extra parity in the extra error correction block illustrated in FIG. 9.

FIG. 11 illustrates a procedure for replacing additional information in a data frame for an extra parity in the extra error correction block illustrated in FIG. 9. Referring to FIG. 11, in a data frame 1100 for an extra parity, data corresponding to ID 1102, IED 1104, and CPR_MAI 1106 is replaced according to a conventional method of forming an error correction block and data corresponding to an EDC 1108 is replaced with an EDC corresponding to the leading 2060 bytes. Such additional information is replaced in order to form an error correction block complying with a conventional standard so that the error correction block is compatible with the conventional standard.

In the above-described methods, a maximum number of errors can be corrected by performing erasure correction when an extra error correction block is corrected using a result of PI correction of a conventional error correction block. In other words, when the PI correction with respect to a row has failed, bytes corresponding to the row within the extra error correction block are considered as errors and are subjected to the erasure correction, whereby a maximum number of error bytes can be corrected.

Hereinafter, embodiments for generating an extra error correction block that is compatible in terms of reproduction with an HD DVD standard according to an aspect of the present invention will be described.

A method of generating an error correction block for an HD DVD complying with a conventional standard is the same as a method of generating an error correction block for a DVD complying with a conventional standard, with the exception that 6-byte CPR_MAI is processed as "reserved" when a scrambled frame is generated. Meanwhile, PO and PI information is added to 16 scrambled frames to form a single error correction block for a DVD. However, for an HD DVD, 32 scrambled frames are divided into a left part and a right part and then alternately arranged within two error correction blocks, and PO and PI information is added to each of the two error correction blocks, thereby generating two error correction blocks.

When the method illustrated in FIG. 5 is used in an embodiment of the present invention, a 16-Kbyte extra parity is added not to 64 Kbytes but to 48 Kbytes of main data, thereby generating a 64-Kbyte extra error correction block. Thereafter, an error correction block for an HD DVD is generated using the extra error correction block as main data. As a result, two correction blocks are generated and two extra error correction blocks are formed for the two correction blocks, respectively.

When the method illustrated in FIG. 5 is used in another embodiment of the present invention, 8 Kbytes remaining after excluding 24 Kbytes from 32 Kbytes of main data before scrambling are replaced with extra parity information using a method similar to the method illustrated in FIG. 8A or 8B, thereby generating two extra error correction blocks. Thereafter, the two extra error correction blocks are disposed within two error correction blocks, respectively, and then scrambling is performed. Next, PO and PI information is added to each of the two error correction blocks.

When the method illustrated in FIG. 6 is used in an embodiment of the present invention, 8 data frames remaining after excluding 24 data frames, which correspond to 48-Kbyte main data, from 32 data frames, which correspond to 64-Kbyte main data, are replaced with extra parities corresponding to parity information regarding the 24 data frames, thereby generating an extra error correction block including the 32 data frames. Thereafter, the 32 data frames are scrambled to generate 32 scrambled data frames. Next, an error correction block is generated in the same manner as a method of generating two error correction blocks for an HD DVD complying with the standardized reference format.

When the method illustrated in FIG. 6 is used in another embodiment of the present invention, an 8-Kbyte extra parity is added to data corresponding to 12 data frames (i.e., 24 Kbytes) to be disposed within a single error correction block among 24 data frames for 48-Kbyte main data, thereby generating an extra error correction block. In two generated extra error correction blocks, ID, IED, CPR_MAI(Reserved) and EDC information is replaced in accordance with an error correction block standard for HD DVDs. Thereafter, scrambling is performed to generate scrambled frames. Next, PO and PI information is added to each of the two extra error correction blocks, thereby generating two error correction blocks.

As similarly done in the embodiment for DVDs, to minimize the reduction of error correction performance of an extra error correction block due to an error occurring when data at positions of ID, IED, Reserved, and EDC information is replaced in a data frame for an extra parity, extra parities may be uniformly dispersed into codewords within an extra error correction block by interleaving.

Error correction performance of conventional standard HD DVDs is about (16*182+10)*2=5844 bytes. However, when an embodiment of the present invention is used, a maximum number of correctable error bytes is as follows. When the method illustrated in FIG. 5 is used to generate an extra error correction block, a maximum number of correctable error bytes is 32*256*2=16384 bytes and is about 2.8 times higher than that obtained in the conventional standard. When the method illustrated in FIG. 6 is used to generate an extra error correction block, a maximum number of correctable error bytes is (48−1)*1728*2=16184 bytes and is about 2.8 times higher than that obtained in the conventional standard.

Hereinafter, embodiments for generating an extra error correction block that is compatible in terms of reproduction with a Blu-ray disc standard according to an embodiment of the present invention will be described.

Figure 12A:
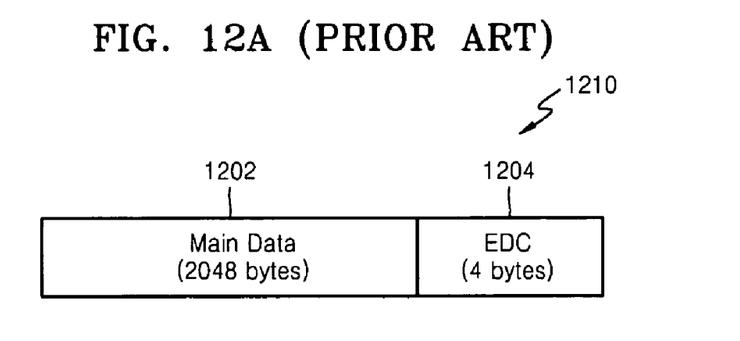
FIG. 12A illustrates the structure of a data frame according to a conventional Blu-ray disc standard.

FIG. 12A illustrates the structure of a data frame according to a conventional Blu-ray disc standard. Referring to FIG. 12A, a data frame for an error correction block of a Blu-ray disc is a size of 2052 bytes obtained by adding 4-byte EDC information to 2048-byte main data.

Figure 12B:
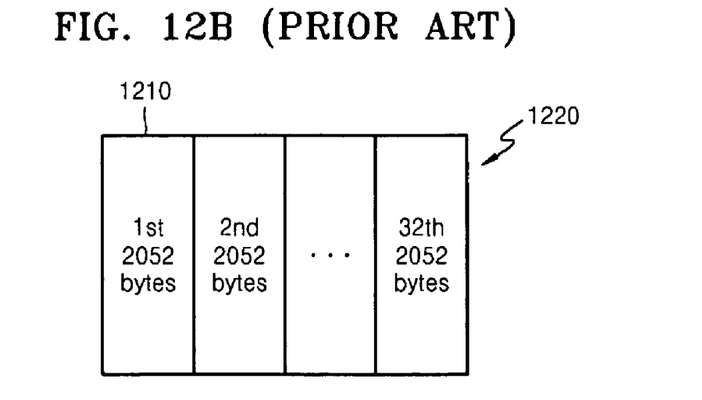
FIG. 12B illustrates the structure of a scrambled data frame set according to the conventional Blu-ray disc standard.

FIG. 12B illustrates the structure of a scrambled data frame set according to the conventional Blu-ray disc standard. Referring to FIG. 12B, a main data block for a Blu-ray disc is comprised of 32 scrambled data frames each being 2052 bytes in size, which are generated by scrambling 32 data frames.

Figure 12C:
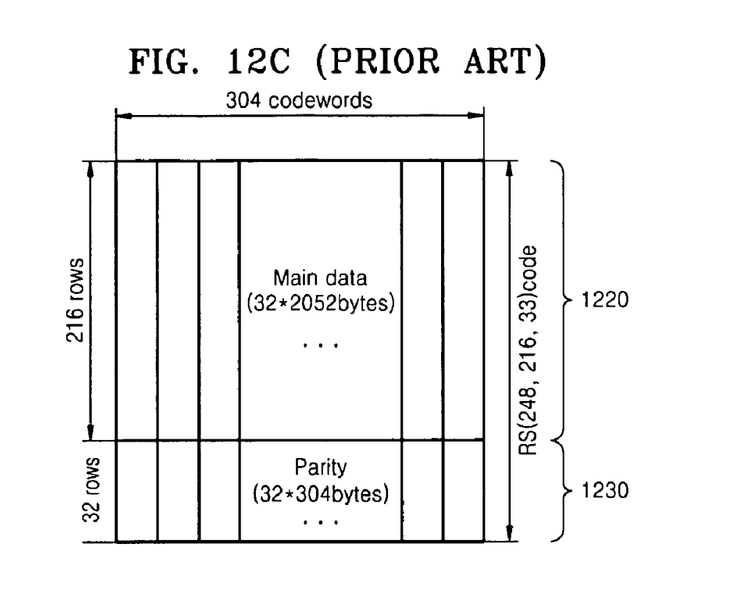
FIG. 12C illustrates the structure of an error correction block according to the conventional Blu-ray disc standard.

FIG. 12C illustrates the structure of an error correction block according to the conventional Blu-ray disc standard. Referring to FIG. 12C, 32 scrambled data frames are disposed in a 216*304 block 1220. Here, data is disposed from top to bottom in a vertical direction and from left to right in a horizontal direction. A parity block 1230 is added to the main data block 1220 by adding a 32-byte parity to each 216-byte column in the main data block 1220. As a result, an error correction block including 304 RS(248,216,33) codes is generated for 64-Kbyte main data.

Figure 13:
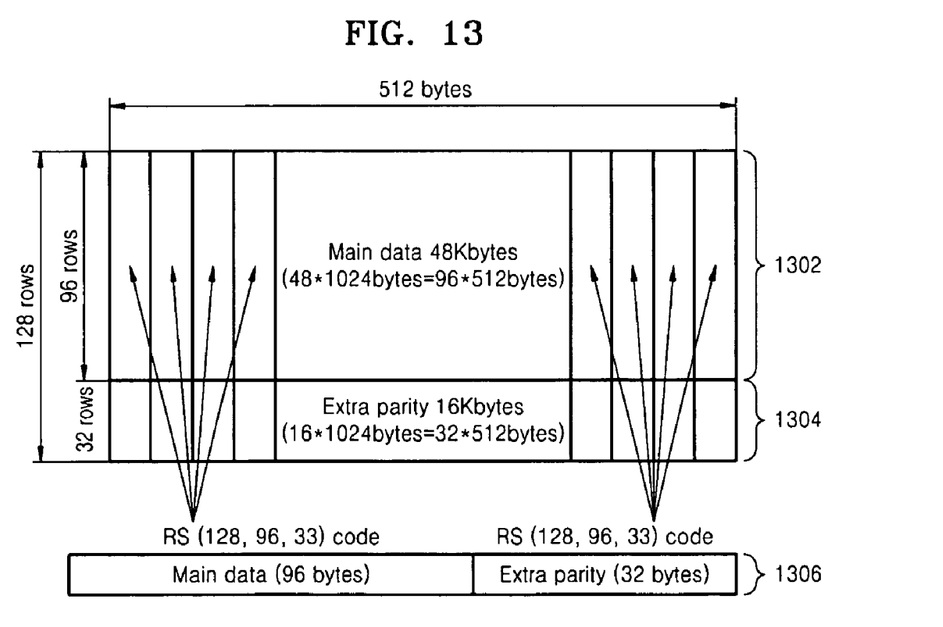
FIG. 13 illustrates an example of an extra error correction block generated to be compatible with the Blu-ray disc standard using the method illustrated in FIG. 5.

FIG. 13 illustrates an example of an extra error correction block generated to be compatible with the Blu-ray disc standard using the method illustrated in FIG. 5. Referring to FIG. 13, an extra parity block 1304 is added to a 96*512 block 1302 which is 48 Kbytes in size by adding a 32-byte extra parity to each 96-byte column in the main data block 1302, thereby forming a 64-Kbyte extra error correction block including 512 RS(128,96,33) codes 1306. Thereafter, data is sequentially extracted 2048 bytes at a time from the 48-Kbyte data within the extra error correction block and is given a 4-byte EDC. As a result, 32 data frames each being 2052 bytes in size are formed. Each of the 32 data frames is scrambled, thereby forming 32 scrambled data frames each being 2052 bytes in size. Thereafter, an error correction block is generated using a conventional method.

A conventional error correction block can correct a maximum of 32*304 bytes=9728 bytes of error by performing erasure correction using a result of error correction of a frame sync and a result of error correction of a burst indicator subcode (BIS) block. However, when the above-described methods according to an embodiment of the present invention are used, a maximum of 32*512 bytes=16384 bytes of error can be corrected. Accordingly, an embodiment of the present invention improves error correction performance by about 1.7 times, compared to the conventional standard. Such an improvement is possible by using a result of error correction of a frame sync and a result of error correction of a BIS block for additional information in a conventional Blu-ray disc error correction block when error correction is performed on an extra error correction block and by performing erasure correction using a result of error correction of an error correction block.

Figure 14:
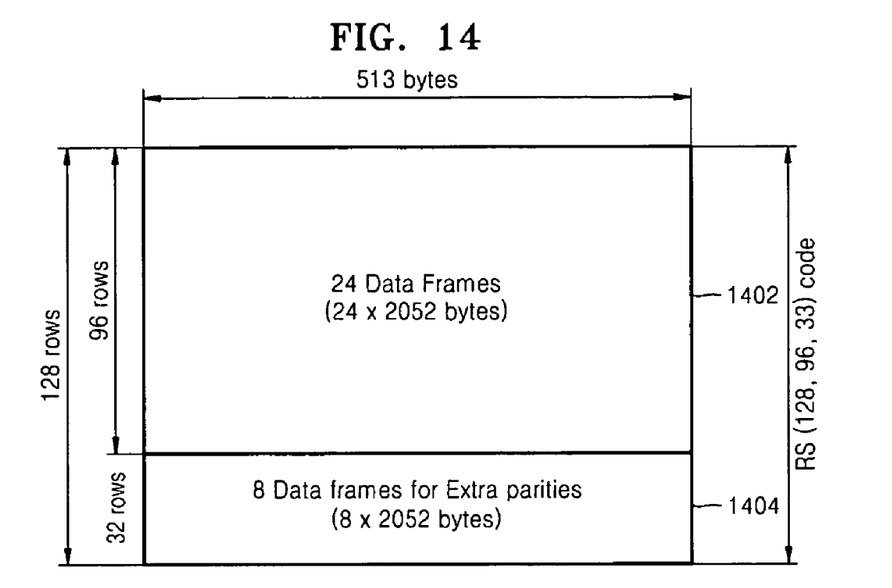
FIG. 14 illustrates an example of an extra error correction block generated to be compatible with the Blu-ray disc standard using the method illustrated in FIG. 6.

FIG. 14 illustrates an example of an extra error correction block generated to be compatible with the Blu-ray disc standard using the method illustrated in FIG. 6. Referring to FIG. 14, a 32-byte extra parity is added to each 96-byte column in 24 data frames 1402 corresponding to 96*513 bytes, thereby generating an extra error correction block comprised of 513 RS(128,96,33) codes. To maximize error correction performance of an extra error correction block for a burst error raising a continuous error caused by, for example, a scratch, when data corresponding to 24 data frames is disposed in a 96*513 block, data corresponding to 96 rows may be disposed from top to bottom in a vertical direction and from left to right in a horizontal direction because main data is disposed in the same manner in a conventional error correction block and disc recording is performed from left to right in the horizontal direction and from top to bottom in the vertical direction.

Figure 15:
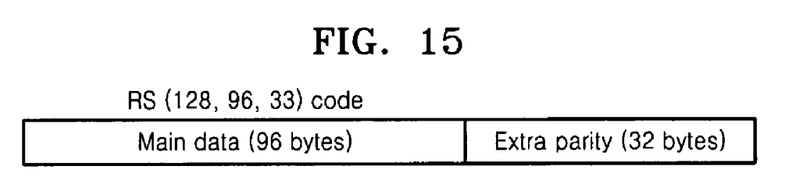
FIG. 15 illustrates an example of an RS code for each column in the extra error correction block illustrated in FIG. 14.

FIG. 15 illustrates an example of an RS code for each column in the extra error correction block illustrated in FIG. 14. Here, the RS code is an RS(128,96,33) code. Similar to a case concerning DVDs, 120-byte data having a value of 00 h is input into an error correction system before 128-byte data so that the RS(128,96,33) code is compatible with the conventional RS(248,216,33) code. As a result, the change in hardware for error correction can be minimized.

Figure 16:
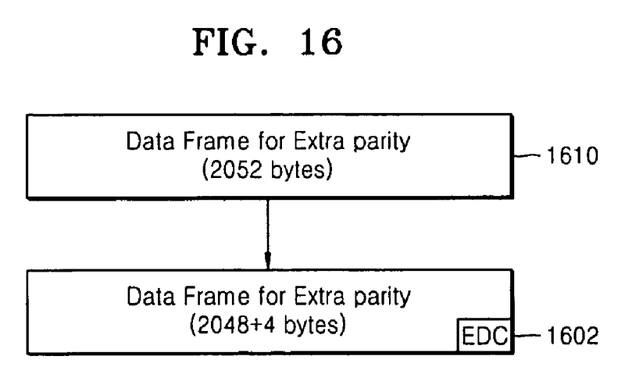
FIG. 16 illustrates a procedure for replacing additional information in a data frame for an extra parity in the extra error correction block illustrated in FIG. 14.

FIG. 16 illustrates a procedure for replacing additional information in a data frame for an extra parity in the extra error correction block illustrated in FIG. 14. Referring to FIG. 16, data corresponding to the last 4 bytes is replaced with EDC data 1602 regarding the remaining 2048 bytes in a data frame 1610 for an extra parity, as is stated in the conventional standard. To disperse error bytes (i.e., 4*8 bytes=32 bytes) occurring due to the replacement of EDC data into the 513 codewords, 2052 bytes of the data frame 1610 for an extra parity may be extracted from the extra error correction block illustrated in FIG. 14, for example, from top to bottom in the vertical direction and then from left to right in the horizontal direction. As a result, error correction loss due to the EDC replacement can be minimized. Referring to FIG. 16, 32 error bytes occurs due to the EDC replacement. Accordingly, if at least 32 codewords are included in the extra error correction block, each codeword has at most one error byte.

The maximum number of error bytes that can be corrected using a conventional error correction block is 32*304 bytes=9728 bytes. However, when an extra error correction block generated using the above-described method according to an embodiment of the present invention is used, the maximum number of error bytes that can be corrected using erasure correction is 32*513 bytes=16416 bytes and is about 1.7 times higher, compared to the conventional error correction block.

While not required in all aspects, the invention can also be embodied as computer readable code on a computer readable recording medium to be implemented by a computer or controller, such as a controller controlling an optical pickup to read/write the data and to encode/decode the data.

As described above, an aspect of the present invention can provide more reliable data to a user as well as reproduction compatibility with an error correction block complying with a conventional standardized format.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An error correction block recorded on a recording medium and to be reproduced by an apparatus, the error correction block having an extended format comprising:
an error correction block structure including main data, additional information, and parity information in a standardized reference format, wherein the main data comprises an extra error correction block comprising input data and extra parity information used by the apparatus for error correction of the main data in addition to the parity information.

2. A method of generating an error correction block having an extended format compatible with an error correction block having a standardized reference format, the method comprising:
adding extra parity information for error correction to input data which is of a smaller size than main data of the standardized reference format, thereby generating an extra error correction block which is of a same size as the main data; and
generating an error correction block complying with the reference format using the extra error correction block as the main data.

3. The method of claim 2, wherein the generating of the error correction block complying with the standardized reference format comprises:
adding additional information including an error detection code to the extra error correction block;
scrambling data in the extra error correction block excluding the additional information; and
adding parity information for error correction to the extra error correction block with the additional information to generate the error correction block.

4. The method of claim 3, wherein the adding of the parity information for error correction to the extra error correction block comprises:
adding outer-code parity information for error correction of the error correction block to the extra error correction block; and
adding inner-code parity information for error correction of the error correction block to the extra error correction block.

5. The method of claim 3, wherein the adding of the additional information further comprises adding address information of the extra error correction block.

6. The method of claim 2, wherein the error correction block having the reference format complies a compact disc standard, a digital versatile disc standard, a high-definition digital versatile disc standard, a Blu-ray disc standard, or combinations thereof.

7. A method of generating an error correction block having an extended format compatible with an error correction block having a standardized reference format, the method comprising:
    adding additional information including at least an error detection code to input data which is a smaller size than main data of the reference format;
    generating an extra error correction block by adding extra parity information for error correction to the additional information added input data;
    replacing data in a portion corresponding to additional information in the extra parity information within the extra error correction block with corresponding additional information of the reference format; and
    generating an error correction block complying with the reference format by adding parity information for error correction to the extra error correction block with the replaced additional information.

8. The method of claim 7, wherein the generating of the error correction block complying with the reference format comprises:
    scrambling data in the extra error correction block excluding the additional information; and
    adding the parity information to the scrambled extra error correction block.

9. The method of claim 7, wherein the generating of the error correction block complying with the reference format comprises:
    adding outer-code parity information for error correction of the error correction block to the extra error correction block; and
    adding inner-code parity information for error correction of the error correction block to the extra error correction block.

10. The method of claim 7, wherein the adding of the additional information comprises adding address information of the input data, and the replacing of the data corresponding to additional information comprises replacing data corresponding to address information in the extra parity information with address information complying with the reference format in the extra error correction block.

11. The method of claim 7, wherein the error correction block having the reference format complies a compact disc standard, a digital versatile disc standard, a high-definition digital versatile disc standard, a Blu-ray disc standard, or combinations thereof.

12. The method of claim 7, wherein the size of the input data is an integer multiple of a size of a data frame comprised in the error correction block having the reference format.

13. An error correction method using an error correction block having an extended format including an error correction block structure including main data, additional information, and parity information in a standardized reference format, wherein the main data is an extra error correction block including input data and extra parity information, the error correction method comprising:
    receiving data having an error correction block structure in the extended format;
    sensing errors in the received data;
    when any error is sensed, correcting the error using the parity information; and
    when all sensed errors are not successfully corrected, correcting remaining errors using the extra parity information.

14. An apparatus for generating an error correction block having an extended format compatible with an error correction block having a standardized reference format, the apparatus comprising:
    an extra error correction block generator receiving input data which is of a smaller size than main data of the standardized reference format and adding extra parity information for error correction to the input data to generate an extra error correction block having a same size as the main data; and
    an error correction block generator generating and outputting an error correction block complying with the standardized reference format using the extra error correction block as the main data.

15. The apparatus of claim 14, wherein the error correction block generator generates the error correction block complying with one of a compact disc standard, a digital versatile disc standard, a high-definition digital versatile disc standard, and a Blu-ray disc standard.

16. The apparatus of claim 14, wherein the error correction block generator adds additional information including at least an error detection code to the extra error correction block, scrambles the extra error correction block, and then adds parity information for error correction to the extra error correction block to generate the error correction block.

17. An apparatus for generating an error correction block having an extended format compatible with an error correction block having a standardized reference format, the apparatus comprising:
    an extra error correction block generator receiving input data which is of a smaller size than main data of the standardized reference format, adding additional information including at least an error detection code to the input data, and adding extra parity information for error correction to the input data with the additional information to generate an extra error correction block; and
    an error correction block replacing data in a portion corresponding to additional information in the extra parity information within the extra error correction block with corresponding additional information of the reference format and adding parity information for error correction to the extra error correction block with the replaced additional information to generate and output an error correction block complying with the reference format.

18. The apparatus of claim 17, wherein the error correction block generator generates the error correction block of a compact disc standard, a digital versatile disc standard, a high-definition digital versatile disc standard, a Blu-ray disc standard, or combinations thereof.

19. The apparatus of claim 17, wherein the error correction block generator scrambles data in the extra error correction block excluding the additional information and adds the parity information to the scrambled extra error correction block to generate the error correction block.

20. A method of generating an error correction block comprising:
    generating an extra error correction block by adding extra parity information to input data, and
    generating the error correction block of a same size as main data of a reference format using the extra error correction block as the main data, wherein the size of the input data is smaller than the main data of a reference format, and the size of the extra error correction block is the same as the main data of the reference format.

21. An apparatus for generating an error correction block comprising:
- a first error correction block generator pre-processing-input data and outputting an extra error correction block having a same size as main data of a reference format, the error correction block including the input data and extra parity information; and
- a second error correction block generator generating the error correction block using the extra error correction block as main data.

22. A method of generating an error correction block having an extended format comprising:

adding additional information to input data which is of a smaller size than main data of a reference format;

adding extra parity information for extra error correction to the input data with the additional information thereby generating an extra error correction block;

replacing data in a portion corresponding to the additional information in the extra parity information included in the extra error correction block with additional information according to the reference format; and scrambling data excluding the additional information in the extra error correction block and adding parity information for error correction, thereby generating an error correction block having the reference format.

* * * * *